(12) United States Patent
Kim et al.

(10) Patent No.: US 6,970,452 B2
(45) Date of Patent: Nov. 29, 2005

(54) COMMON SUBSCRIBER MANAGING APPARATUS AND METHOD BASED ON FUNCTIONAL MODELING OF A COMMON SUBSCRIBER SERVER FOR USE IN AN ALL-IP NETWORK AND METHOD THEREFOR

(75) Inventors: Dong-Hoon Kim, Seoul (KR); Han-Koo Chun, Seoul (KR); Dong-Hyun Lee, Seoul (KR); Jong-Eon Joo, Seoul (KR); Jin-Hyung Yang, Seoul (KR); Jong-Man Lee, Seoul (KR)

(73) Assignee: Curitell Communications Inc., Kyoungki-Do (KR)

( * ) Notice: Subject to any disclaimer, the term of this patent is extended or adjusted under 35 U.S.C. 154(b) by 894 days.

(21) Appl. No.: 09/804,912

(22) Filed: Mar. 13, 2001

(65) Prior Publication Data

US 2002/0003789 A1    Jan. 10, 2002

(30) Foreign Application Priority Data

| Mar. 13, 2000 | (KR) | 2000-12554 |
| Mar. 13, 2000 | (KR) | 2000-12555 |
| Mar. 13, 2000 | (KR) | 2000-12557 |

(51) Int. Cl.[7] .......................................... H04L 12/66
(52) U.S. Cl. .................................................. 370/352
(58) Field of Search ........................ 370/351–357, 370/389, 395.3–395.32, 395.5–395.54, 331, 370/349; 455/432.1–432.3

(56) References Cited

U.S. PATENT DOCUMENTS 6,157,953 A   12/2000 Chang et al. .............. 709/225

6,608,832 B2 *  8/2003 Forslow ...................... 370/353

OTHER PUBLICATIONS

"Technical Specification Group Services and Systems Aspects: Architecture of All IP Network"; 3GPP TR 23.922, Version 1.0.0, Oct. 1, 1999; pp. 1-68.
"Diameter Mobile IP Extensions"; Internet Draft, Oct. 1999, pp. 1-33.
"Services Trading for Mobile Agents with LDAP as Service Directory"; by Park et al.; IEEE 1998, 0-8186-8751; Jul. 1998; pp. 270-275.
"Mobile IP"; Internet Article, 'Online,'; Jul. 13, 1999; pp. 1-63.

* cited by examiner

Primary Examiner—Chi Pham
Assistant Examiner—Thai Hoang
(74) Attorney, Agent, or Firm—Baker Botts LLP (57) ABSTRACT

A common subscriber managing apparatus and method for use in an all Internet Protocol network integrating a circuit network for voice and a packet network for data. The apparatus comprises a portable user terminating unit satisfying media standards supported in the network, a wireless interfacing unit controlling wireless resources of the user terminating unit and wireless traffic, controlling handoff, realigning data from and to the packet network upon interface request of the user terminating unit, providing realigned data to the user terminating unit and transferring media to another user terminating unit, a call controlling unit controlling a call between the wireless interfacing unit and common subscriber managing unit, and common subscriber managing unit for providing Security Association setup function for voice processing and commonly managing mobility management, Quality of Service, authentication and authorization management, accounting management and service management functions for the user terminating unit through a common subscriber database.

11 Claims, 10 Drawing Sheets

COMMON SUBSCRIBER MANAGING APPARATUS AND METHOD BASED ON FUNCTIONAL MODELING OF A COMMON SUBSCRIBER SERVER FOR USE IN AN ALL-IP NETWORK AND METHOD THEREFOR

FIELD OF THE INVENTION

The present invention relates to a common subscriber managing apparatus for commonly managing functions such as mobility management function, call related service management function, QoS (Quality of Service) management function, authentication and authorization management function, accounting management function and other existing subscriber server function by using common subscriber database in an ALL-IP (internet protocol) network that is based on a next generation mobile communication network such as IMT (International Mobile Telecommunication)-2000 and UMTS (Universal Mobile Telecommunication Service) for each of which standardization is progressed to European scheme and North-American scheme, a method therefor, and a computer readable recording medium for recording a program for implementing the method.

PRIOR ART OF THE INVENTION

Recently, international standardization associations of 3GPP (3-rd Generation Partnership Projects) and 3GPP2 discuss an All-IP (all-Internet Protocol) network in which the whole IMT (International Mobile Telecommunication)-2000 system is based on an IP based network and specification for implementing the ALL-IP network is expected to be included in 2000 specification.

Figure 1:
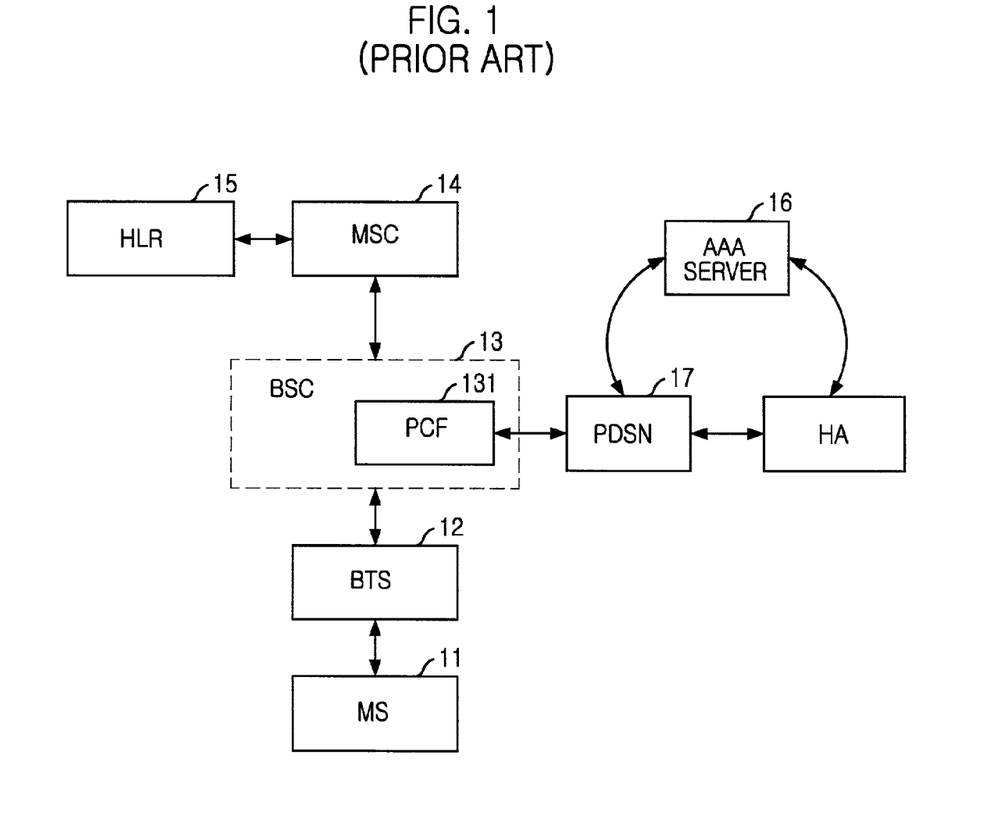
FIG. 1 shows a diagram of network structure of a conventional next generation mobile communication system.

As shown in FIG. 1, such ALL-IP network has a number of differences from the network structure of a conventional next generation mobile communication system. It is desirable to integrate a HLR/AUC (Home Location Register/Authentication) that is an existing circuit management server and an AAA (Authorization Authentication Accounting) server that is a packet management server and define a new function for a subscriber server. In particular, for authentication of voice, it is required voice security processing function of the Internet introducing authentication procedure that is used currently, for which security mechanism that is used in an identical IP packet network can be applied. Also, for mobility processing, it will be helpful to add a function in an identical equipment in an effective call scenario establishment.

In the ALL-IP network, the subscriber processing server is proposed to provide effective ALL-IP services including all of mobility management function, call related service management function, QoS (Quality of Service) management function, authentication and authorization management function and accounting function.

Now, it will be described for a conventional next generation mobile communication system.

FIG. 1 show a conventional next generation mobile communication system, which comprises a MS (Mobile Station) 11, a BTS (Base Station Transceiver) 12, a BSC (Base Station Controller) 13, a MSC (Mobile Switching Center) 14, a HLR (Home Location Register) 15, an AAA server 16 and a PDSN (Packet Data Serving Node) 17. The BSC includes a PCF (Packet Control Function) 131.

The MS 11 is within a service area of an arbitrary BTS 12. Information of the MS 11 is transferred to the MSC 14 through the BTS 12 and its controlling BSC 13. Information from the MSC 14 is transferred to the MS 11 through the BTS 12 and the BSC 13.

The MS 11 is a wireless mobile terminal, e.g., a PDA (Personal Digital Assistant), for mobile communication and uses forward channel for receiving data and reverse channel for transmitting data.

Text message that is transmitted and received at the MS 11 is transferred to the MSC 14 through the BTS 12 and the BSC 13 for high frequency signal processing and call processing.

The BTS 12 interfaces the MS 11 to the BSC 13 and includes a DCU (Digital Channel Unit), a TCU (Time/Frequency Control Unit), a RFU (Radio Frequency Unit) and a GPS (Global Positioning System). The BTS 12 has air-interface with the MS 11 and line-interface with the BSC 13.

The BSC 13 interfaces the BTS 12 to the MSC 14 to adjust connections among the BTSs 12 and performs signal processing function for communications between the BTS 12 and the MSC 14. The PCF 131 in the BSC 13 interacts with the PDSN 17 to process multimedia data.

The MSC 14 includes a VLR (Visitor Location Register) and interacts with the HLR 15 to process mobile communication subscriber calls. The MSC 14 interfaces with the BSC 13 to perform call setup and release and various functions such as call processing and supplementary service related functions.

Here, the VLR is a database for temporally storing subscriber information related the MS 11 within the service area of the VLR. The VLR downloads information of the MS 11 and the subscriber registered within its serving area from the HLR 15 to store temporally, which is located within the MSC 14.

The HLR 15 that is a circuit management server is a database, connected to the MSC 14, for managing information of the mobile subscribers. The HLR 15 interacts a number of the MSCs 14 to perform subscriber location registration and stores permanent information of the MS 11 and the subscriber and location information. The HLR 15 interacts with the VLR to support the call processing and various functions related to the supplementary services. In particular, in a circuit network, the HLR 15 provides voice call related mobility and service related function.

Also, the AUC that is a circuit management server performs authentication procedure by using unique algorithm with the MS 11 to check whether the MS 11 is permitted to access the circuit network when the MS 11 requests a call to the network.

The AAA server 16 performs authentication for access from the PDSN 17 to the PDSN 17 when the MS requests data service and management function for encryption key and encryption level for data encryption and accounting data collection function when the MS 17 transfers data in the Internet.

As shown in FIG. 1, since the circuit network for voice and the packet network for data are discriminated in the convention next generation mobile communication system, they have respectively the subscriber servers, the AAA server 16 and the HLR(AUC) 15.

As described above, mobility and authentication functions are performed by separate procedures in the separate networks in the convention next generation mobile communication system. Since the ALL-IP network integrates all the networks, call processing procedure is very complex if mobility and authentication functions are respectively performed by the conventional HLR 15 and the AUC. Furthermore, when voice is transferred through the Internet in an IP packet, it is believed to be impossible to encrypt properly in the Internet, and security problems may be induced. Therefore, mobility and authentication functions should be integrated to be proper to the Internet in the ALL-IP network, for which it is required to have a common subscriber server. The prior art is not believed to meet these objectives.

SUMMARY OF THE INVENTION

Therefore, it is an object of the present invention to provide a common subscriber managing apparatus for commonly managing functions such as mobility management function, call related service management function, QoS (Quality of Service) management function, authentication and authorization management function, accounting management function and other existing subscriber server function by using common subscriber database in an ALL-IP (internet protocol) network that is based on a next generation mobile communication network, a method therefore, and a computer readable recording medium for recording a program for implementing the method. It will be understood by those of skill in the art that while reference is made herein to, and the preferred embodiments of the invention principally contemplate, an "ALL-IP" network, the teachings of the present invention could also have utility for any network principally comprising, or containing substantial amounts of data formatted for, Internet Protocol transmission, even if such networks or transmissions also transferred, contained, or were configured for a certain quantity of non-Internet Protocol data as well.

In accordance with an aspect of the present invention, there is provided a common subscriber managing apparatus for use in an ALL-IP network (all Internet Protocol) in which a circuit network for voice and a packet network for data are integrated, the apparatus comprising a user terminating unit being portable and satisfying media (voice or data) standard supported in the ALL-IP network, a wireless interfacing unit for controlling wireless resources of the user terminating unit and wireless traffic, controlling handoff, realigning data from and to the packet network based on a request of the user terminating unit to have interfacing condition, providing the realigned data to the user terminating unit, and transferring the media to another user terminating unit, a call controlling unit for controlling a call between the wireless interfacing unit and common subscriber managing unit, and the common subscriber managing unit for providing SA (Security Association) setup function for voice processing and commonly managing mobility management, QoS (Quality of Service), authentication and authorization management, accounting management and service management functions for the user terminating unit by using a common subscriber database.

In accordance with another aspect of the present invention, there is provided a method for managing commonly subscribers for use in an ALL-IP (all Internet Protocol) network in which a circuit network for voice and a packet network for data are integrated, the method comprising the steps of (a) modeling to provide, by a server, mobility management, QoS (Quality of Service), authentication and authorization management, accounting management and service management for a roaming terminal by using a common subscriber database for ALL-IP service, and (b) setting SA (Security Association) function for voice processing by setting up a call between a ALL-IP visiting network and a home network by the server and commonly managing the mobility management, the QoS, the authentication and authorization management, the accounting management and the service management.

And, in accordance with still another aspect of the present invention, there is provided a computer readable recording medium for recording a program for implementing in an ALL-IP (all Internet Protocol) network having a processor the functions of (a) modeling to provide, by a server, mobility management, QoS (Quality of Service), authentication and authorization management, accounting management and service management for a roaming terminal by using a common subscriber database for ALL-IP service, and (b) setting SA (Security Association) function for voice processing by setting up a call between a ALL-IP visiting network and a home network by the server and commonly managing the mobility management, the QoS, the authentication and authorization management, the accounting management and the service management.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENTS OF THE INVENTION

An ALL-IP (all Internet Protocol) concept is introduced in 3GPP and 3GPP2 and there is a trend to integrate conventional HLR, AUC, AAA into a network element. Therefore, the present invention provides a CSS (Common Subscriber Server) for use in the ALL-IP network. That is, the present invention provides a functional model of the CSS, which uses commonly mobility management function, call related service management function, QoS (Quality of Service) management function, authentication and authorization management function and accounting function by a common subscriber database.

While conventional authentication procedure for voice is performed during network access, encryption translation procedure is required at a final node of a packet network after Bearer data encryption after SA (Security Association) is performed in the conventional Internet in the ALL-IP in which voice is transferred in IP frames.

In order to introduce such an Internet related authentication technique, SA setup and authentication key management function that are performed at the AAA server of the conventional packet network should be introduced. For effective call scenario, the CSS should include mobility management function and service management function. Therefore, the CSS performs commonly the mobility management function, the QoS management function, the service management function, the authentication and authorization function and the accounting function.

By using the CSS capable of supporting an Internet authentication mechanism required in the ALL-IP network, the present invention is capable of message encryption/decryption of the IP scheme when voice is transferred in the IP frames so as to perform complete security processing for voice and provide the mobility management function, the QoS management function, the service management function, the authentication and authorization function and the accounting function.

Hereinafter, several embodiments of the present invention and measurement results will be described in detail with reference to the accompanying drawings.

Figure 2:
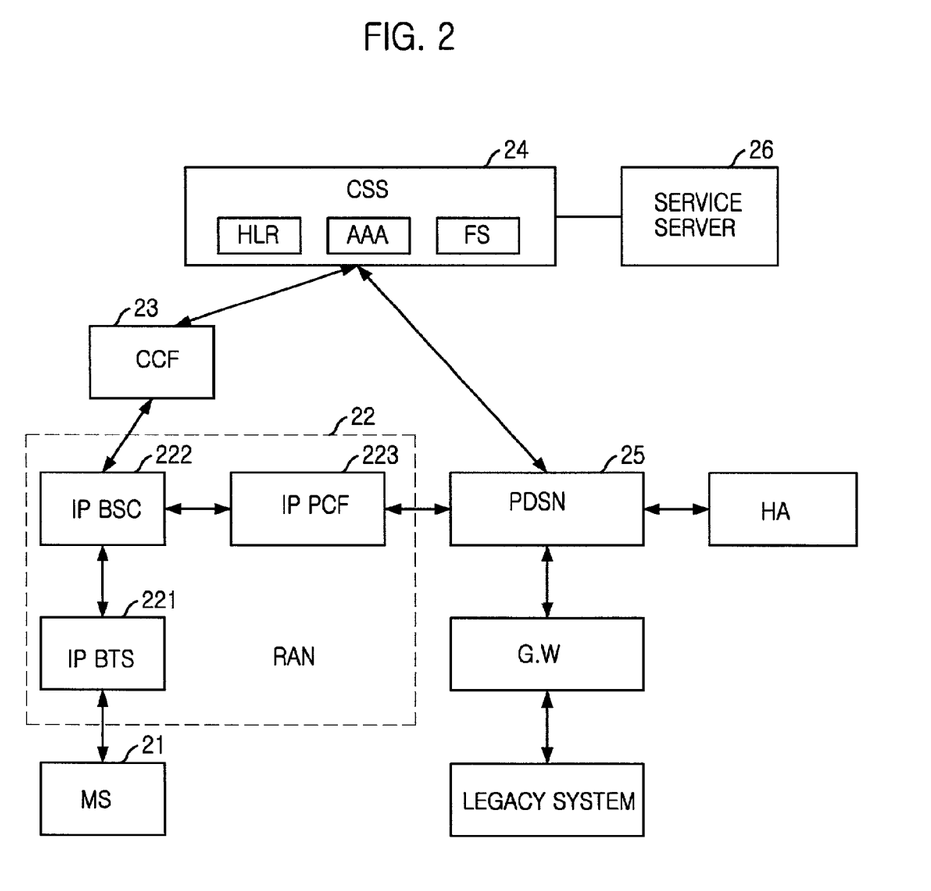
FIG. 2 shows a diagram of one embodiment of a CSS in an ALL-IP network in accordance with the present invention.

FIG. 2 shows a diagram of one embodiment of a CSS in an ALL-IP network in accordance with the present invention.

As shown in FIG. 2, the CSS in the ALL-IP network of the present invention comprises a MS (Mobile Station) 21 that is compatible to a media (voice, image, moving image data) standard that is supported by the ALL-IP network, a RAN (Radio Access Network) 22 for controlling wireless resource of the MS 21 and wireless traffic, controlling handoff, realigning data from/to a packet network 25 based on a request of the MS 21 to have interface criteria, and providing the realigned data to the MS 21, a CCF (Call Control Function) 23 for controlling a call between the RAN 22 and a CSS 24, and the CSS 24 for providing SA setup function for voice processing and commonly managing the mobility management function, the QoS management function, the service management function, the authentication and authorization function and the accounting function for the MS 21 by using a common subscriber database.

Comparing with the conventional next generation mobile communication system as shown in FIG. 1, the ALL-IP network comprises the CCF 23 for call control function instead of a MSC (mobile switching center) and the RAN 22 includes an IP BSC (Base Station Controller) 222, an IP BTS (Base Station Transceiver) 221 as shown in FIG. 2.

Here, the IP BSC 222 can be omitted but the IP BSC 221 is itself connected to the IP network, i.e., the IP BSC 221 is an IP node.

Therefore, the RAN 22 can be constructed in many forms including the IP BTS 221, the IP BSC 222 and the IP FCF (Packet Control Function) 223.

The RAN 22 controls wireless resources management and wireless traffic and controls handoff. Also, the RAN 22 combines input signals through multi-path or selects one of frames during the handoff to improve the QoS.

When the IP BTS 221 is the IP node, functions of the convention IP BSC 222 are distributed to the IP BTS 221 and CCF 23 of the core network so that the IP BSC can be omitted. For this, some problems should be solved.

Firstly, during soft handoff between the IP BTSs 221, quality of data that is transferred from the MS 21 to the network is improved by diversity function. That is, data transferred via the multi-path are combined or one of frame is selected to improve the quality of data.

Since frame selection function is disposed at the conventional IP BSC 222, it should be submitted to one of the IP BTS 221 and the core network. However, because the core network can not take this frame selection function, this function is disposed at the IP BTS 221. At this time, because the frame selection could induce frequent data generation between the IP BTSs 221, a solution, i.e., location of a proper diversity apparatus, is requested.

Secondly, another point that should be considered in location of the frame selection apparatus is that the QoS is not certain in the Internet. Therefore, a connecting method between an apparatus that is implemented for the frame selection function that requires real time processing and the IP BTS 221 should be provided.

For this, the frame selection apparatus is discriminated as a diversity apparatus separate from the IP BTS 221, which is connected to the IP BTS 221 through a direct path instead of the conventional Internet path. Here, because the Internet cannot satisfy real time characteristic as described above, the frame selection is performed effectively using the direct path. Of course, when the Internet can certain real time processing enough, the direct path can be replaced with the Internet obviously. In particular, the location of the diversity apparatus can be performed using a number of methods. Desirably, each IP BTS 221 has the diversity apparatus and a direct path provides between the diversity apparatuses in the ALL-IP network, or each group of IP BTS 221 has the diversity apparatus and a direct path provides between the diversity apparatuses and between the IP BTS 221 and the diversity apparatus so that the frame selection function can be supported during the soft handoff. The selection criteria can be capability of the diversity apparatus.

The RAN 22 that can be implemented in various forms transfers data between the RAN 22 and the packet network 25 under control of the IP BSC 222 at the PCF 223 and realigns compressed data that is transferred through the packet network, whose data rate is adjusted between the RAN 22 and the packet network 25 to provide the compressed data. Also, the RAN 22 controls the wireless resources of the MS 21 and wireless traffic, controls the handoff, realigns data from/to the packet network 25 to have interface condition based on the request of the MS 21 to provide to the MS 21, and transfers voice and data to another MS 21.

It will be described in detail for one embodiment of the functional model of the CSS 24 for an ALL-IP service.

Embodiment 1

Figure 3:
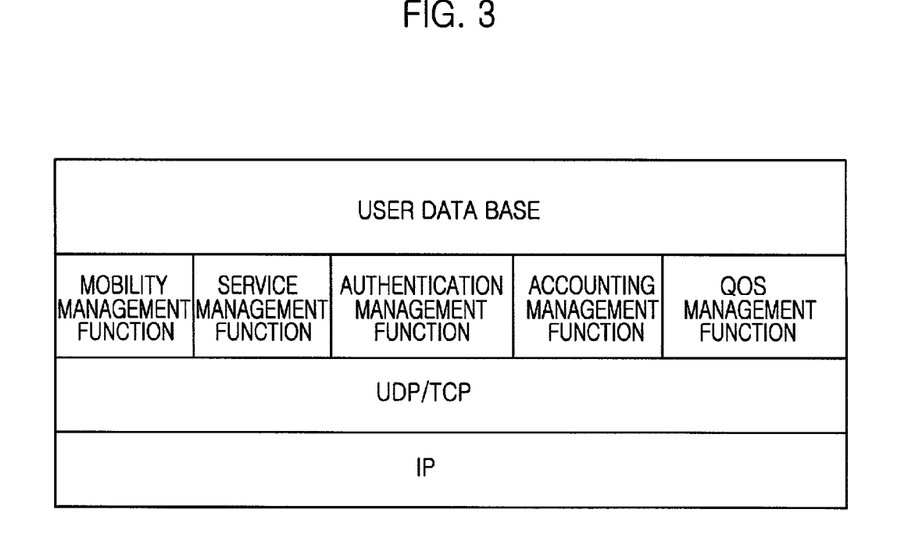
FIG. 3 offers a diagram for explaining function model of a CSS (ALL-IP) for common subscriber managing function in accordance with one embodiment of the present invention.

The functional model of the CSS 24 and a service server 26 for the ALL-IP service is shown in FIG. 3.

Referring to FIG. 3, the CSS 24 manages the mobility management function and the service management function that are conventionally managed by the HLR and the authentication related function managed by the AUC in the conventional $3^{rd}$ mobile communication system or $2^{nd}$ mobile communication system. Also, the CSS 24 manages the QOS management function, the authentication management and accounting management function that is conventionally managed by the AAA server in the packet network in the $3^{rd}$ mobile communication system and is designed to share common subscriber database.

Figure 4:
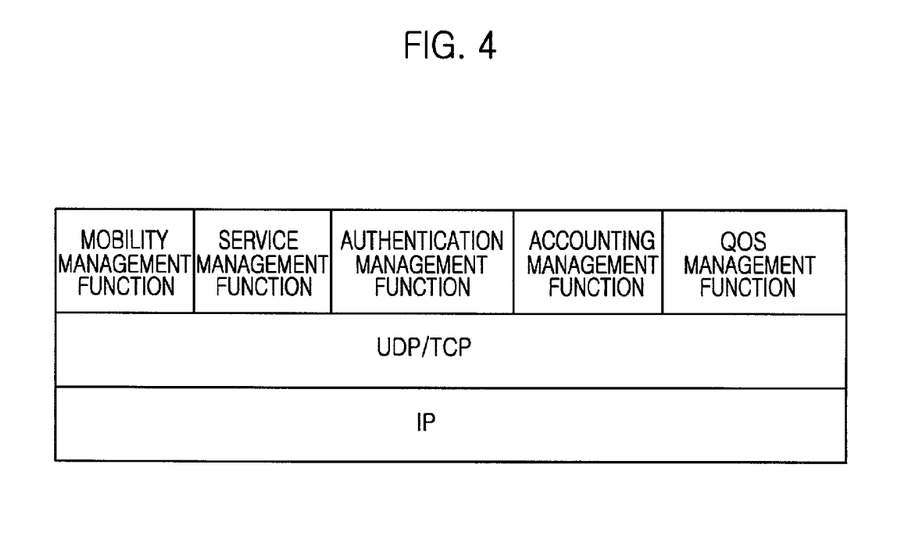
FIG. 4 provides a diagram of an exemplary structure of CSS protocol for common subscriber managing function in accordance with one embodiment of the present invention.

FIG. 4 provides protocol stack of the CSS 24 as described above.

Referring to FIG. 4, the CSS 24 uses LDAP (Lightweight Directory Access Protocol) for the mobility management function and the service management function and DIAMETER protocol as application layer for the QoS, authentication and accounting function. The CSS 24 uses UDP/TCP (User Datagram Protocol/Transmission Control Protocol) as transmission layer protocol and IP as network layer protocol.

Figure 5:
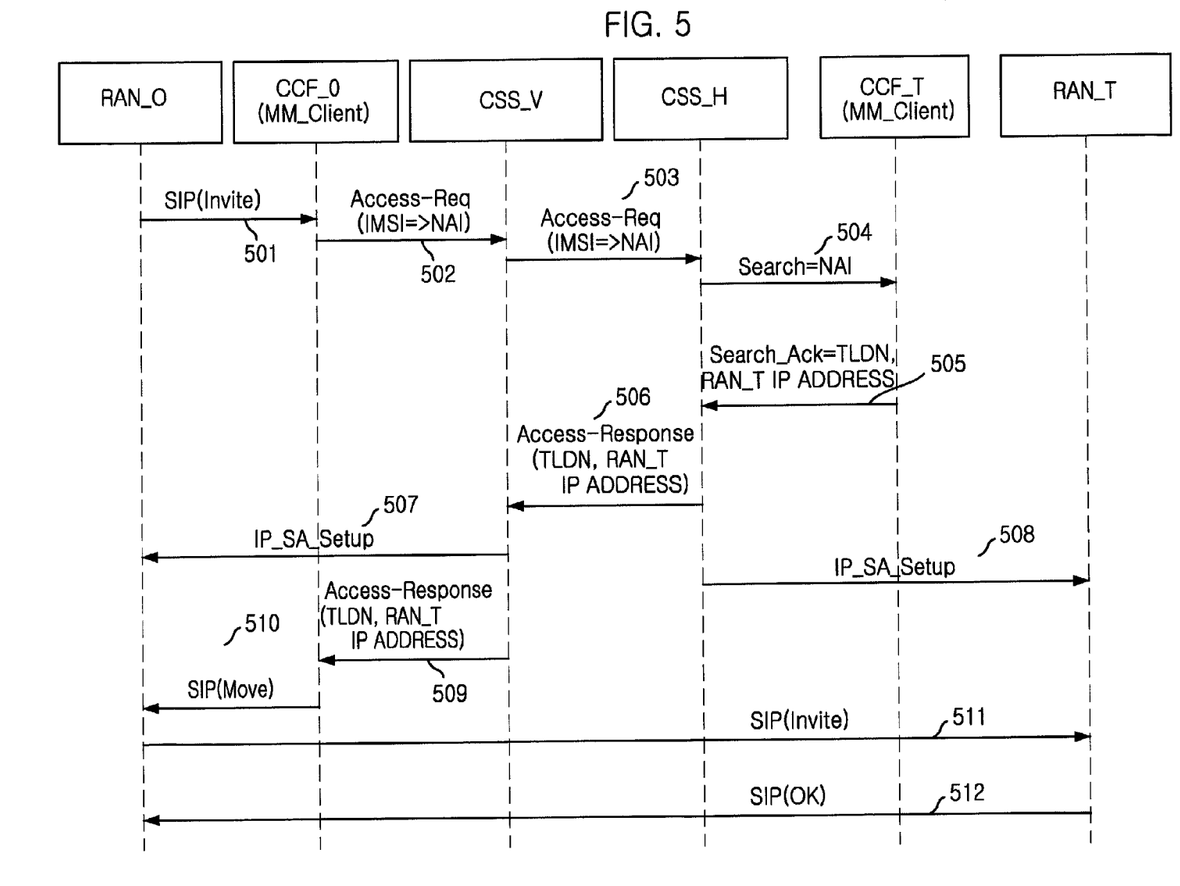
FIG. 5 is a flow chart for call setup in a CSS method based on functional model of the CSS in accordance with one embodiment of the present invention.

FIG. 5 is a flow chart for call setup in a CSS method based on functional model of the CSS in accordance with one embodiment of the present invention.

As shown in FIG. 5, during the call setup procedure among a common subscriber managing method based on the function model of the CSS in accordance with the present invention, an originating RAN (RAN_0) transmits 501 a call setup request message of SIP (Session Initialization Protocol) (SIP(invite)) to an originating CCF (CCF_0), the CCF_0 generates a NAI (Network Access Identity) by using IMSI (International Mobile Station Identity) for identifying a subscriber and transfers 502 it to the visiting CSS (CSS_V). At this time, the CSS_V searches 503 Home CSS (CSS_H) for proxy processing of a corresponding message.

Then, the CSS_H transfers 504 it to a terminating CCF (CCF_T) that manages a terminating subscriber by using search function of the LDAP protocol and then the CCF_T obtains 505 TLDN (Temporary Local Directory Number) of the terminating subscriber and the location of the RAN at which the subscriber is located (RAN_T IP address) to transfer it to the CSS_H by using search-ack function of the LDAP protocol.

Then, the CSS_H transfers 506 access-response of the DIAMETER protocol including the TLDN and the RAN_T IP address to the CSS_V and then each of the CSS_V and the CSS_H transfers 507, 508 IP_Sec_SetUp message of the DIAMETER protocol for SA setup to each of the RAN_O and the RAN_T, respectively, and sets SA between the RAN_O and the RAN_T.

Then, when the CSS_V receives 509 the access-response, the CCF_O transfers 510 a path reset request message of the SIP protocol (SIP(Move)) to the RAN_O for call setup to the RAN_T. At this time, the RAN_O transfers 511 the call setup request message (SIP(invite)) to the RAN_T, for which the RAN_T transfers 512 a call setup completion message (SIP(OK)) to a RAN_O to notify call setup completion.

Embodiment 2

Figure 6:
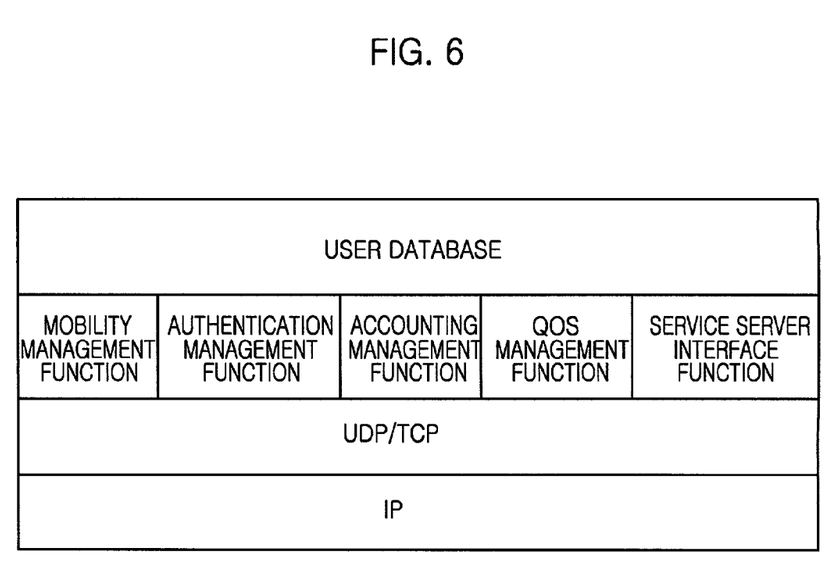
FIG. 6 presents a diagram for explaining functional model of a CSS (ALL-IP) for common subscriber managing function in accordance with another embodiment of the present invention.

FIG. 6 presents a functional model of the CSS 24 for the ALL-IP service.

Referring to FIG. 6, the CSS 24 manages the mobility management function that are conventionally managed by the HLR and interaction function for a service server 26 having the service management function, and the authentication related function managed by the AUC in the conventional $3^{rd}$ mobile communication system or $2^{nd}$ mobile communication system. Also, the CSS 24 manages the QoS management function, the authentication management and accounting management function that is conventionally managed by the AAA server in the packet network in the $3^{rd}$ mobile communication system and is designed to share common subscriber database.

Figure 7:
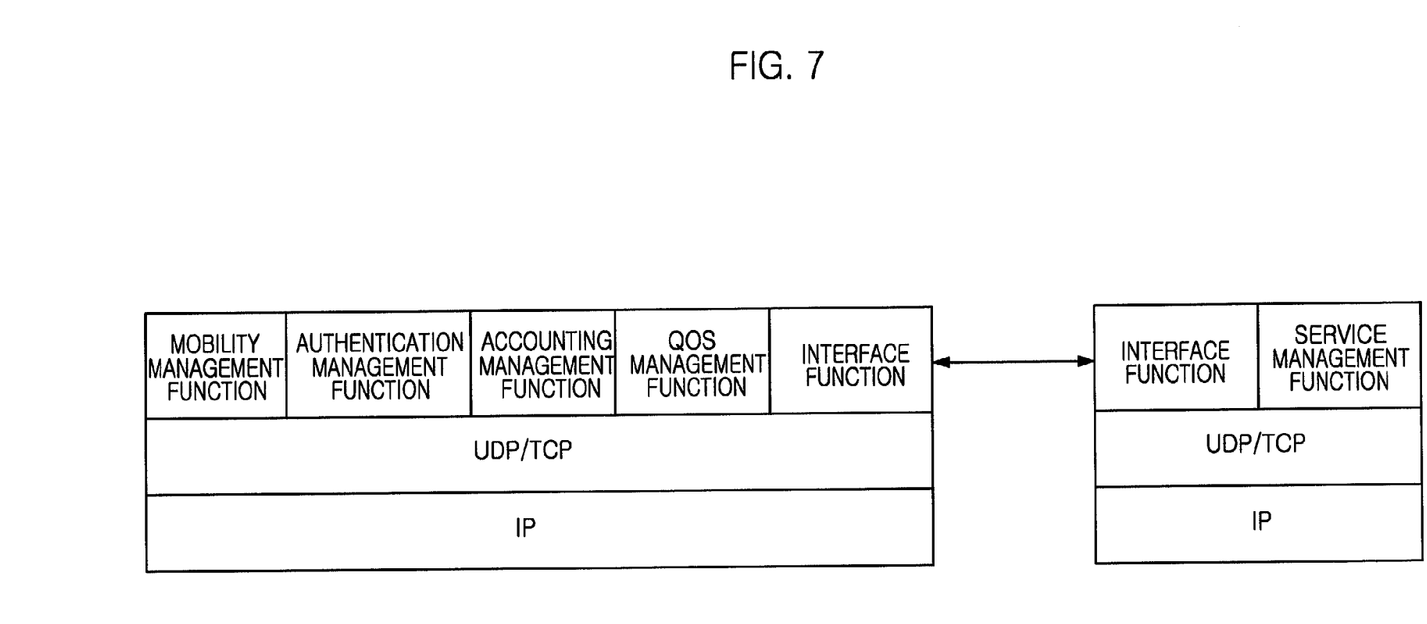
FIG. 7 shows a diagram of an exemplary structure of protocol for common subscriber managing function in accordance with another embodiment of the present invention.

FIG. 7 provides protocol stack of the CSS 24 as described above.

Referring to FIG. 7, the CSS 24 uses the LDAP for the mobility management function and the DIAMETER protocol as application layer for the QoS, authentication and accounting function. The CSS 24 has service server interaction function for interacting with the service server 26 capable of the service management function. The CSS 24 uses UDP/TCP as transmission layer protocol and IP as network layer protocol.

On the other hand, the service server 26 uses the LDAP as application layer for the service management function and has interaction function to interact with the CSS 24. Also, the service server 26 uses UDP/TCP as transmission layer protocol and IP as network layer protocol.

Figure 8:
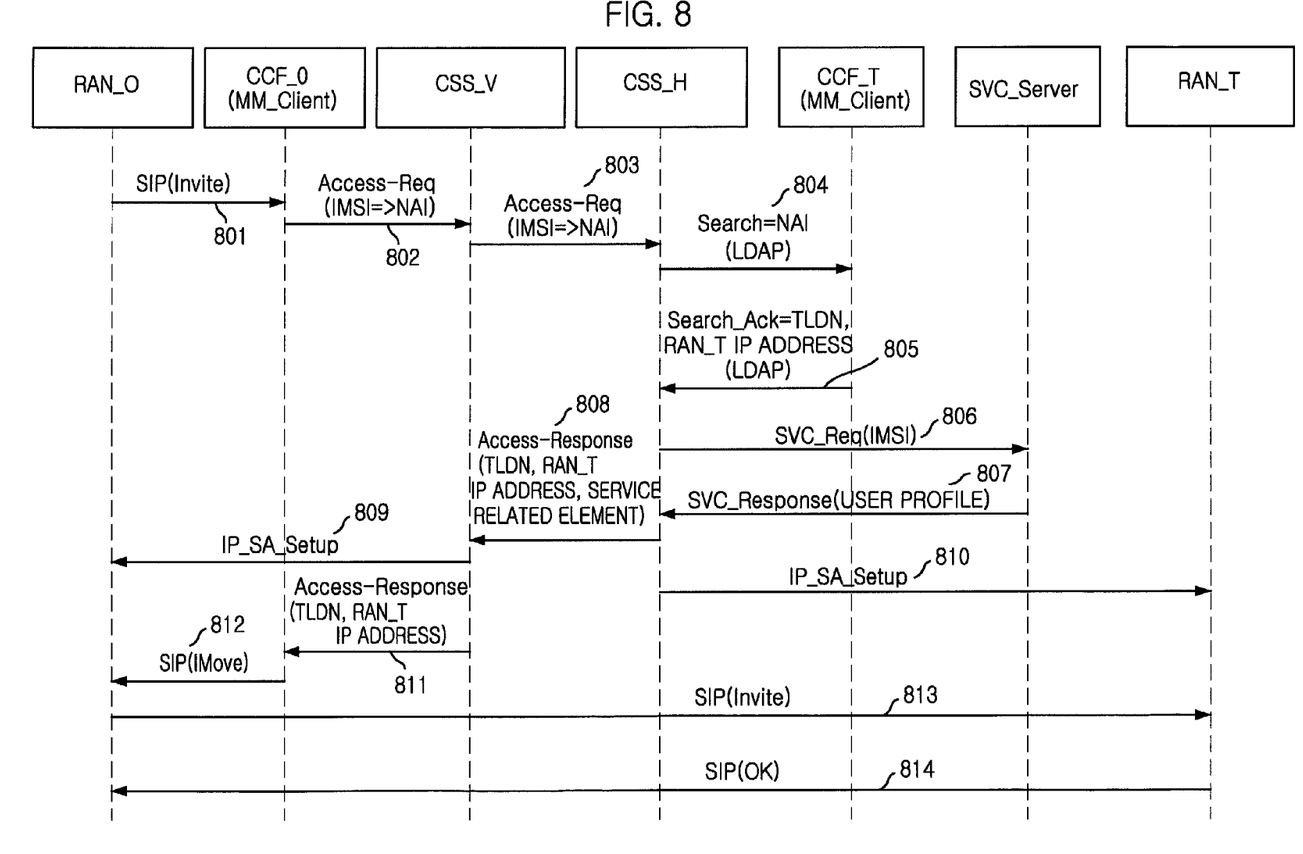
FIG. 8 offers a flow chart for call setup in a common subscriber managing method based on functional model of the CSS in accordance with another embodiment of the present invention.

FIG. 8 offers a flow chart for call setup procedure of the common subscriber managing method of the present invention.

As shown in FIG. 8, during the call setup procedure of the common subscriber managing method of the present invention, an originating RAN (RAN_0) transmits 801 a call setup request message of SIP (Session Initialization Protocol) (SIP(invite)) to an originating CCF (CCF_0), the CCF_0 generates a NAI (Network Access Identity) by using IMSI (International Mobile Station Identity) for identifying a subscriber and transfers 802 it to the visiting CSS (CSS_V). At this time, the CSS_V searches 803 Home CSS (CSS_H) for proxy processing of a corresponding message.

Then, the CSS_H transfers 804 it to a terminating CCF (CCF_T) that manages a terminating subscriber by using search function of the LDAP protocol and then the CCF_T obtains 805 TLDN (Temporary Local Directory Number) of the terminating subscriber and the location of the RAN at which the subscriber is located (RAN_T IP address) to transfer it to the CSS_H by using search-back function of the LDAP protocol.

Then, the CSS_H requests 806 a service by transferring a service request message (SVC-request) in the IMSI and then the service server responses 807 to the service request by transferring subscriber service related profile in a service request response message (SVC-response) to the CSS-H.

Then, the CSS_H transfers 808 an access-response message of the DIAMETER protocol including the TLDN, the RAN_T IP address and service related information to the CSS_V and then each of the CSS_V and the CSS_H transfers 809, 810 IP_Sec_SetUp message of the IDAMETER protocol for SA setup to each of the RAN_O and the RAN_T, respectively, and sets SA between the RAN_O and the RAN_T.

Then, when receiving 811 the access-response from the CSS_V, the CCF_O transfers 812 a path reset request message of the SIP protocol (SIP(Move)) to the RAN_O for call setup to the RAN_T. At this time, the RAN_O transfers 814 the call setup request message (SIP(invite)) to the RAN_T, for which the RAN_T transfers 814 a call setup completion message (SIP(OK)) to a RAN_O to notify call setup completion.

Embodiment 3

Figure 9A:
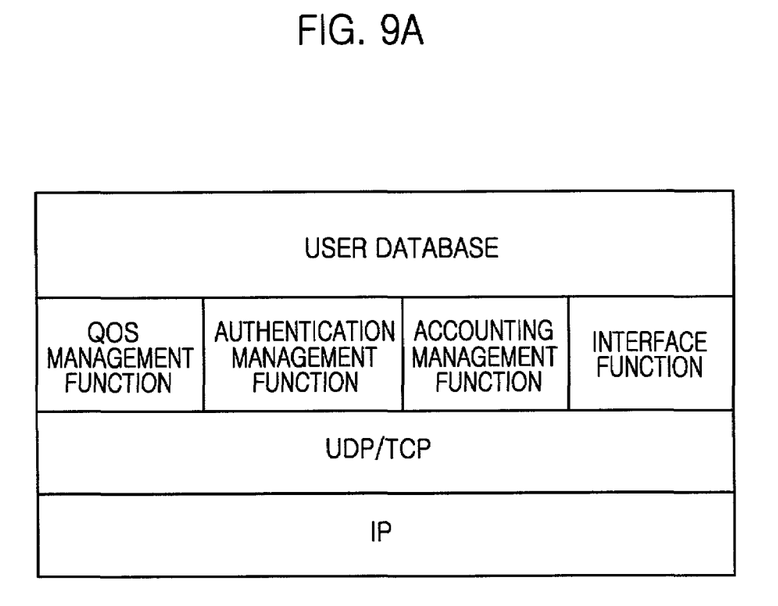
FIGS. 9A and 9B provide an exemplary structure of protocol for common subscriber managing function in accordance with still another embodiment of the present invention.

FIG. 9A provides a functional model of the CSS 24 for the ALL-IP service.

Referring to FIG. 9A, the CSS 24 manages interaction function to interact with a service server 26 that manages the mobility management function and service management function that are conventionally managed by the HLR and the authentication related function managed by the AUC in the conventional $3^{rd}$ mobile communication system or $2^{nd}$ mobile communication system. Also, the CSS 24 manages the QoS management function, the authentication management and accounting management function that is conventionally managed by the AAA server in the packet network in the $3^{rd}$ mobile communication system and is designed to share common subscriber database.

Referring to FIG. 9A, the CSS 24 uses the DIAMETER protocol as application layer protocol for the QoS, authentication and accounting function. The CSS 24 has service server interaction function for interacting with the service server capable of the mobility management and service management functions. The CSS 24 uses UDP/TCP as transmission layer protocol and IP as network layer protocol.

Figure 9B:
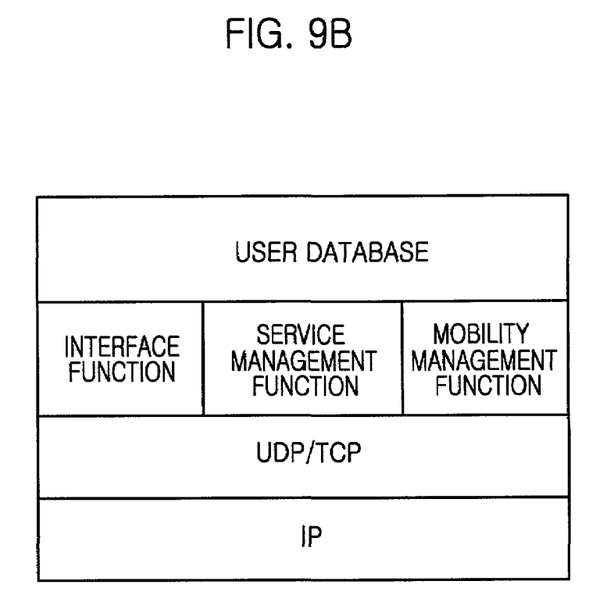

On the other hand, referring to FIG. 9B, the service server 26 uses the LDAP for the mobility management function and the service management functions. The service server 26 has service server interaction function for interacting with the CSS 24. Also, the service server 26 uses UDP/TCP as transmission layer protocol and IP as network layer protocol.

Figure 10:
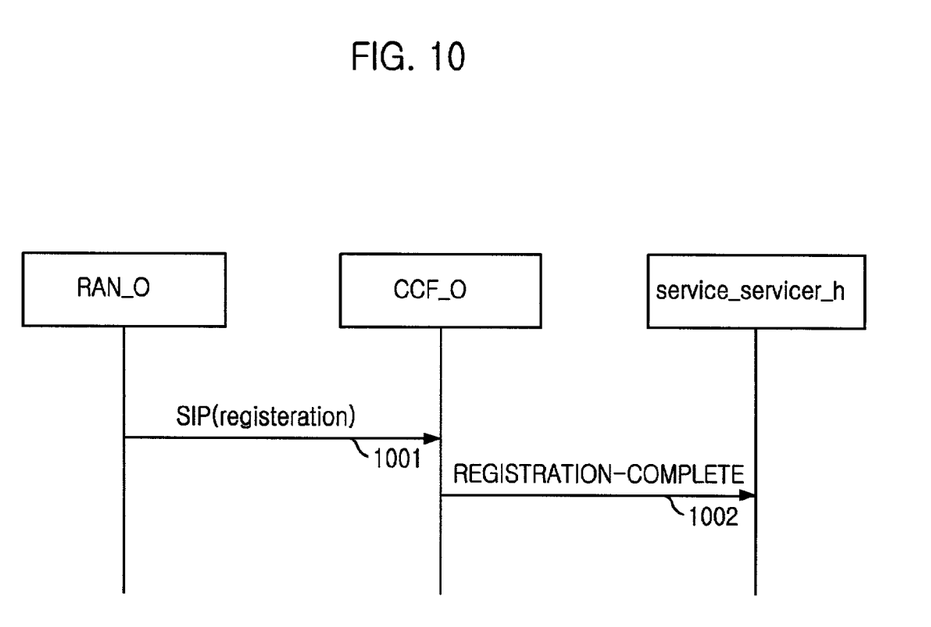
FIG. 10 is a flow chart for location registration in a common subscriber managing method based on functional model of the CSS in accordance with still another embodiment of the present invention.

FIG. 10 is a flow chart for location registration of a common subscriber managing method of the present invention.

As shown in FIG. 10, during the location registration procedure in a common subscriber managing method of the present invention, an originating RAN (RAN_0) transfers 1001 a location registration message of the SIP (SIP(registration)) to an originating CCF (CCF_O) and then the CCF_O transfers 1002 the location registration message to the service server to register it.

Figure 11:
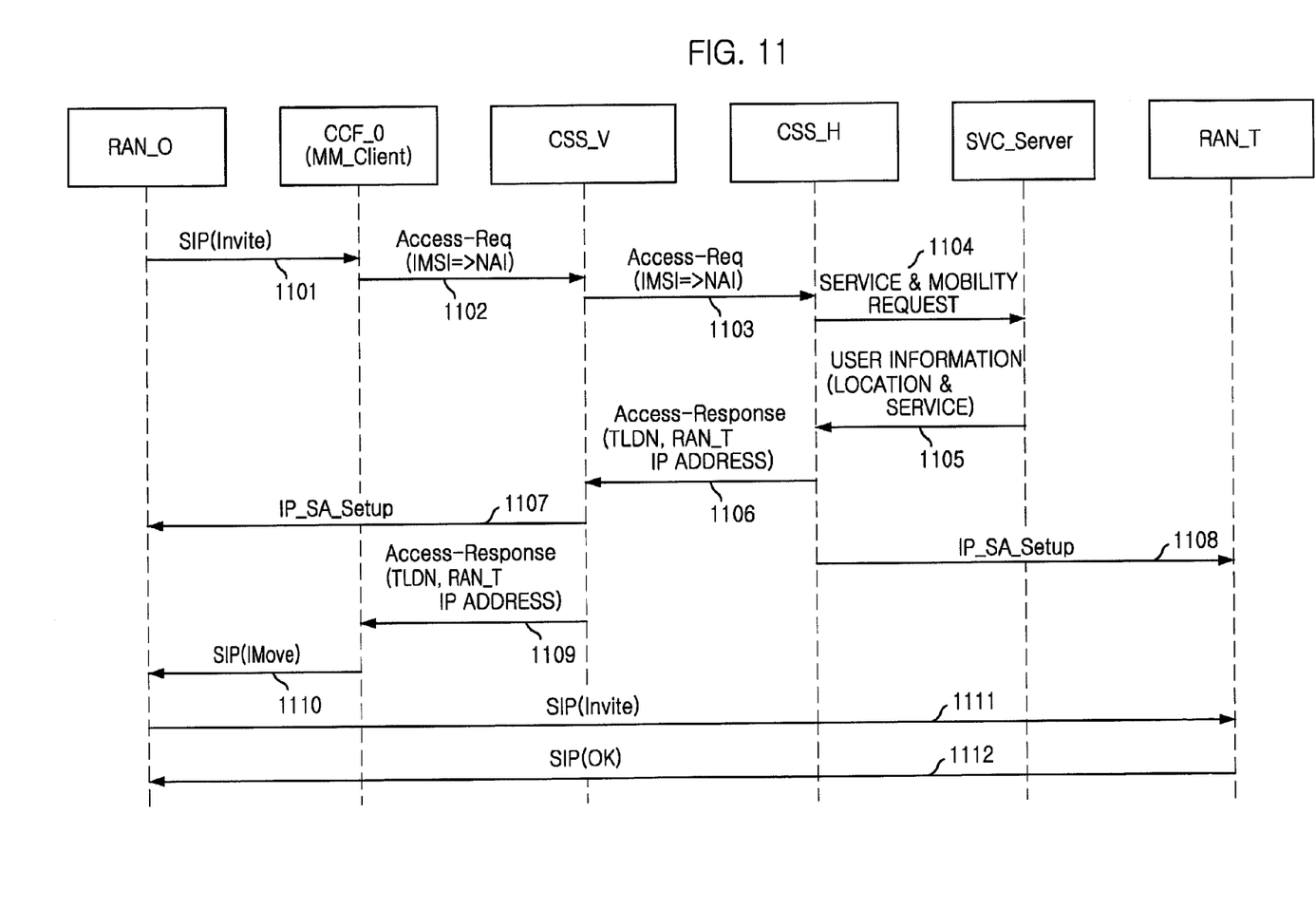
FIG. 11 presents a flow chart for call setup in a CSS method based on functional model of the CSS in accordance with still another embodiment of the present invention.

FIG. 11 presents a flow chart for call setup of a CSS method of the present invention.

As shown in FIG. 11, during the call setup procedure of the common subscriber managing method of the present invention, an originating RAN (RAN_0) transmits 1101 a call setup request message of SIP (Session Initialization Protocol) (SIP(invite)) to an originating CCF (CCF_0), the CCF_0 generates a NAI (Network Access Identity) by using IMSI (International Mobile Station Identity) for identifying a subscriber and transfers 1102 it to the visiting CSS (CSS_V). At this time, the CSS_V searches 1103 Home CSS (CSS_H) for proxy processing of a corresponding message.

Then, when the CSS_H requests 1104 a service and mobility to the service server, the service server sends 1105 subscriber information (location and service related information) to the CSS_H.

Then, when the CSS_H transfers 1106 an access-response message of the DIAMETER protocol including the TLDN and the RAN_T IP address to the CSS_V and then each of the CSS_V and the CSS_H transfers 1107, 1108 IP_Sec_SetUp message of the IDAMETER protocol for SA setup to each of the RAN_O and the RAN_T, respectively, and sets SA between the RAN_O and the RAN_T.

Then, when receiving 1109 the access-response from the CSS_V, the CCF_O transfers 1110 a path reset request message of the SIP protocol (SIP(Move)) to the RAN_O for call setup to the RAN_T. At this time, the RAN_O transfers 1111 the call setup request message (SIP(invite)) to the RAN_T, for which the RAN_T transfers 1112 a call setup completion message (SIP(OK)) to a RAN_O to notify call setup completion.

As described above, the present invention is capable of supporting an Internet authentication mechanism required in the ALL-IP network, the present invention is capable of message encryption/decryption of the IP scheme when voice is transferred in the IP frames so as to perform complete security processing for voice and provide the mobility management function, the QoS management function, the service management function, the authentication and authorization function and the accounting function.

Although the preferred embodiments of the invention have been disclosed for illustrative purpose, these embodiments are not intended to be exhaustive or to delimit the scope of the present invention. Rather, those skilled in the art will appreciate that various modifications, additions, and substitutions thereto are possible, without departing from the scope and spirit of the invention, which are limited only by the accompanying claims.

What is claimed is:

1. A common subscriber managing apparatus for use in an Internet Protocol network in which a circuit network for voice and a packet network for data are integrated, the apparatus comprising:

first portable user terminating means satisfying media voice or data standard supported in the network;

wireless interfacing means for controlling wireless resources of said user terminating means and wireless traffic, controlling handoff, realigning data from and to the packet network based on a request of said user terminating means to have interfacing condition, providing the realigned data to said user terminating means, and transferring the media to a second user terminating means;

call controlling means for controlling a call between the wireless interfacing means and common subscriber managing means; and common subscriber managing means for providing Security Association setup function for voice processing and commonly managing mobility management, Quality of Service, authentication and authorization management, accounting management and service management functions for said first user terminating means by using a common subscriber database, wherein the common subscriber managing means uses a first protocol for mobility management and service management and a second protocol for Quality of Service management, for authentication and accounting management as application layer protocol, and for constructing protocol stack for implementing common subscriber management function.

2. The apparatus as recited in claim 1, further comprising service managing means for performing the service management functions.

3. The apparatus as recited in claim 2, wherein said common subscriber managing means uses User Datagram Protocol/Transmission Control Protocol as a transmission layer protocol.

4. The apparatus as recited in claim 2, wherein said common subscriber managing means uses Internet Protocol as a network layer protocol.

5. A method for managing commonly subscribers for use in an Internet Protocol network in which a circuit network for voice and a packet network for data are integrated, the method comprising the steps of:

(a) modeling to provide, by a server, mobility management, Quality of Service, authentication and authorization management, accounting management, and service management for a roaming terminal by using a common subscriber database for all Internet Protocol service, and wherein, during step (a), the method uses a first protocol for mobility management and the service management and a second protocol for Quality of Service management, for authentication and accounting management as application layer protocol, and for constructing protocol stack for implementing common subscriber management function; and (b) setting Security Association function for voice processing by setting up a call between an ALL-IP visiting network and a home network by the server and commonly managing the mobility management, the QoS, the authentication and authorization management, the accounting management, and the service management.

6. The method as recited in claim 5, wherein, during step (a), the method uses User Datagram Protocol/Transmission Control Protocol as a transmission layer protocol.

7. The method as recited in claim 5, wherein, during step (a), Internet Protocol is used as a network layer protocol.

8. The method as recited in claim 5, wherein step (b) includes:
(i) when an originating Radio Access Network (RAN_0) transmits a call setup request message to an originating Call Control Function (CCF_0), transferring an access request message from the CCF_0 to a visiting common subscriber server (CSS_V);
(ii) searching a Home CSS (CSS_H) by the CSS_V for proxy processing of a corresponding message;
(iii) obtaining by the CSS_V a Temporary Local Directory Number and location information of a terminating subscriber from a terminating Call Control Function (CCF_T) to transfer said Temporary Local Directory Number TLDN and the said location information to said CSS_H;
(iv) transferring a Security Association setup message from said CSS_V and said CSS_H to said RAN_O and said location information, respectively, and setting said Security Association between said RAN_O and said location information;
(v) when said CSS_V receives a access response message, transferring a path reset request message for call setup for said location information from said CCF_O to said RAN_O; and
(vi) setting up a call between the Internet Protocol visiting network and the home network by transferring the call setup request message from said location information to the RAN_T and transferring a call setup completion message from said location information to said RAN_O.

9. The method as recited in claim 5, wherein step (b) includes:
(i) when an originating Radio Access Network (RAN_0) transmits a call setup request message to an originating Call Control Function (CCF_0), transferring an access request message from said CCF_0 to a visiting common subscriber server (CSS_V);
(ii) searching a Home CSS (CSS_H) by the CSS_V for proxy processing of a corresponding message;
(iii) obtaining through said CSS_H a Temporary Local Directory Number (TLDN) and location information (RAN_T) of a terminating subscriber from a terminating Call Control Function (CCF_T) to said CCF_T;
(iv) requesting a service by said CSS_H and obtaining service related profile from a server corresponding to said service by said CSS_H;
(v) providing said TLDN, said RAN_T IP address, and service related information for the terminating subscriber, from said CSS_H to said CSS_V;
(vi) transferring a Security Association setup message from said CSS_V and said CSS_H to said RAN_O and said RAN_13 T, respectively, and setting said Security Association between said RAN_O and said RAN_T;
(vii) when said CSS_V receives an access response message, transferring a path reset request message for call setup for said RAN_T from said CCF_O to said RAN_O; and
(viii) setting up a call between the Internet Protocol visiting network and the home network by transferring said call setup request message from said RAN_O to said RAN_T and transferring a call setup completion message from said RAN_T to said RAN_O.

10. The method as recited in claim 5, wherein step (b) includes:
(i) when an originating Radio Access Network (RAN_0) transmits a call setup request message to an originating Call Control Function (CCF_0), transferring an access request message from said CCF_0 a visiting common subscriber server (CSS_V);
(ii) searching a Home common subscriber service (CSS_H) by said CSS_V for proxy processing of a corresponding message;
(iii) using said CSS_H for requesting a service and mobility to a service server;
(iv) providing a Temporary Local Directory Number (TLDN) and location information (RAN_T IP address) of a terminating subscriber from said CCS_H to said CCS_V;
(v) transferring a Security Association setup message from said CSS_V and said CSS_H to said RAN_O and said R_T, respectively, and setting said Security Association between said RAN_O and said RAN_T;
(vi) when said CSS_V receives a access response message, transferring a path reset request message for call setup for said RAN_T from said CCF_O to said RAN_O; and
(i) setting up a call between the Internet Protocol visiting network and the home network by transferring the call setup request message from said RAN_O to said RAN_T and transferring a call setup completion message from said RAN_T to said RAN_O.

11. In an Internet Protocol network having a processor, a computer readable recording medium for recording a program for implementing the functions of:

(a) modeling to provide, by a server, mobility management, Quality of Service, authentication and authorization management, accounting management and service management functions for a roaming terminal by using a common subscriber database for Internet Protocol service, wherein, during step (a), the method uses a first protocol for mobility management and the service management and a second protocol for Quality of Service management, for authentication and accounting management as application layer protocol, and for constructing protocol stack for implementing common subscriber management function; and (b) setting a Security Association function for voice processing by setting up a call between an Internet Protocol visiting network and a home network by the server and commonly managing the mobility management, Quality of Service, authentication and authorization management, accounting management, and service management functions.

* * * * *

UNITED STATES PATENT AND TRADEMARK OFFICE
CERTIFICATE OF CORRECTION

PATENT NO. : 6,970,452 B2  Page 1 of 1
APPLICATION NO. : 09/804912
DATED : November 29, 2005
INVENTOR(S) : Dong-Hoon Kim et al.

It is certified that error appears in the above-identified patent and that said Letters Patent is hereby corrected as shown below:

Column 5, Line 46, delete the text "the CSS in".

Signed and Sealed this

Fifth Day of December, 2006

JON W. DUDAS
*Director of the United States Patent and Trademark Office*